US006703783B2

(12) United States Patent  
George

(10) Patent No.: US 6,703,783 B2  
(45) Date of Patent: Mar. 9, 2004

(54) FOCUS VOLTAGE CONTROL ARRANGEMENT

(75) Inventor: John Barrett George, Carmel, IN (US)

(73) Assignee: Thomson Licensing S.A., Boulogne Cedex (FR)

(*) Notice: Subject to any disclaimer, the term of this patent is extended or adjusted under 35 U.S.C. 154(b) by 0 days.

(21) Appl. No.: 10/340,147

(22) Filed: Jan. 10, 2003

(65) Prior Publication Data

US 2003/0197479 A1 Oct. 23, 2003

Related U.S. Application Data

(60) Provisional application No. 60/374,280, filed on Apr. 19, 2002.

(51) Int. Cl.[7] ............................................. H01J 29/96
(52) U.S. Cl. ........................ 315/3; 315/382.1; 313/414
(58) Field of Search .......................... 315/3, 9, 382.1, 315/403, 411; 348/327, 377; 313/390, 414, 441, 458

(56) References Cited

U.S. PATENT DOCUMENTS

| | | | | |
|---|---|---|---|---|
| 3,177,396 | A | | 4/1965 | Brooks .......................... 315/31 |
| 5,034,665 | A | | 7/1991 | Wignot et al. ................ 315/386 |
| 5,036,260 | A | * | 7/1991 | George ........................ 315/384 |
| 5,066,887 | A | | 11/1991 | New ............................ 313/414 |
| 5,177,413 | A | | 1/1993 | Wilber ......................... 315/383 |
| 5,341,071 | A | | 8/1994 | George ....................... 315/382.1 |
| 5,394,188 | A | * | 2/1995 | Ohira .......................... 348/327 |
| 5,428,272 | A | | 6/1995 | George et al. ............... 315/411 |
| 5,486,741 | A | | 1/1996 | George ......................... 315/382 |
| 5,532,558 | A | | 7/1996 | George ....................... 315/382.1 |
| 5,565,746 | A | | 10/1996 | George ......................... 315/382 |
| 5,883,794 | A | * | 3/1999 | Takahashi et al. ........... 363/21 |
| 6,115,085 | A | * | 9/2000 | George et al. ............... 348/806 |
| 6,297,600 | B1 | | 10/2001 | George ......................... 315/386 |
| 6,300,731 | B1 | | 10/2001 | George ......................... 315/382 |

* cited by examiner

*Primary Examiner*—Don Wong  
*Assistant Examiner*—Jimmy T. Vu  
(74) *Attorney, Agent, or Firm*—Joseph S. Tripoli; Harvey D. Fried; Sammy S. Henig

(57) ABSTRACT

A video imaging apparatus comprises first and second cathode-ray tubes, each having an ultor electrode and a focus electrode. A power supply generates an ultor voltage, which may have a fluctuating voltage component produced by beam current variations, and which is coupled to first and second ultor electrodes of the first and second cathode-ray tubes. A high voltage amplifier generates a dynamic focus voltage component at a frequency related to a deflection frequency. A combining network combines the fluctuating voltage component and the dynamic focus voltage component to develop a combined, dynamic focus voltage. The combined, dynamic focus voltage is coupled to each of the first and second focus electrodes for developing from the combined, dynamic focus voltage each of a first dynamic focus voltage at the first focus electrode and a second dynamic focus voltage at the second focus electrode.

16 Claims, 5 Drawing Sheets

FOCUS VOLTAGE CONTROL ARRANGEMENT

CROSS REFERENCE TO RELATED APPLICATIONS

This application claims the benefit of the priority date of U.S. Provisional patent application Ser. No. 60/374,280, filed Apr. 19, 2002.

FIELD OF THE INVENTION

This invention relates to powering of kinescopes, and more particularly to focus tracking in the presence of ultor voltage variation.

BACKGROUND OF THE INVENTION

Video displays, such as are used for television viewing and computer operation, often use kinescopes, picture tubes, or cathode ray tubes (CRTs) as the display device. A picture tube is a vacuum tube which has a phosphorescent display screen and control terminals for directing a focussed electron beam toward the screen to generate the desired image. In general, a picture tube requires a relatively high anode or "ultor" voltage to accelerate the electron beam toward the screen, a cathode and a grid which coact for modulating the intensity of the electron beam in accordance with the image to be generated, and a focus electrode to which a focus voltage is applied to cause the electron beam to be focussed at the screen. In addition, a picture tube is associated with a deflection arrangement for deflecting the electron beam both vertically and horizontally. The ultor or anode voltage of the picture tube is often regulated in order to reduce voltage changes attributable to interaction between the internal impedance of the ultor voltage source and the varying cathode or beam current required to generate an image. "Static" focus voltage is applied to the focus terminal of the picture tube in order to focus the electron beam at a given location, such as the center of the screen. It is well understood that the value of the "static" focus voltage is desirably a fixed proportion of the ultor voltage. Dynamic focus control is often provided for adjusting the value of the focus voltage applied to the picture tube in accordance with the position of the electron beam, in order to keep the electron beam focussed on the screen notwithstanding the changing length of the electron beam path attributable to deflection.

SUMMARY OF THE INVENTION

A video imaging apparatus according to an aspect of the invention comprises a first cathode-ray tube having a first ultor electrode and a first focus electrode, and a second cathode-ray tube having a second ultor electrode and a second focus electrode. A power supply for generating an ultor voltage is coupled to the first and second ultor electrodes. The ultor voltage may have a fluctuating voltage component produced by beam current variations. A high voltage amplifier generates a dynamic focus voltage component at a frequency related to a deflection frequency. A combining network combines the fluctuating voltage component and the dynamic focus voltage component to develop a combined, dynamic focus voltage. The combined, dynamic focus voltage is coupled to each of the first and second focus electrodes for developing from the combined, dynamic focus voltage each of a first dynamic focus voltage at the first focus electrode and a second dynamic focus voltage at the second focus electrode.

According to another aspect of the invention, a video imaging apparatus comprises a first cathode-ray tube having a first ultor electrode and a first focus electrode, and a second cathode-ray tube having a second ultor electrode and a second focus electrode. A power supply generates an ultor voltage coupled to the first and second ultor electrodes having a fluctuating voltage component produced by beam current variations. A high voltage amplifier generates a dynamic focus voltage component at a frequency related to a deflection frequency. A combining network combines the fluctuating voltage component and the dynamic focus voltage component to develop a combined, dynamic focus voltage. A first voltage divider is responsive to the combined, dynamic focus voltage for developing from the combined, dynamic focus voltage a first dynamic focus voltage at the first focus electrode, and a second voltage divider is responsive to the combined, dynamic focus voltage for developing from the combined, dynamic focus voltage a second focus voltage at the second focus electrode.

A video imaging apparatus according to another aspect of the invention comprises a first cathode-ray tube having a first ultor electrode and a first focus electrode, and a second cathode-ray tube having a second ultor electrode and a second focus electrode. A power supply for generating an ultor voltage is coupled to the first and second ultor electrodes. The ultor voltage may have a fluctuating voltage component produced by beam current variations. A high voltage amplifier generates a dynamic focus voltage component at a frequency related to a deflection frequency. A combining network combines the fluctuating voltage component and the dynamic focus voltage component to develop a combined, dynamic focus voltage. The combined, dynamic focus voltage is coupled to each of the first and second focus electrodes for developing from the combined, dynamic focus voltage each of a first dynamic focus voltage at the first focus electrode and a second dynamic focus voltage at the second focus electrode.

According to yet another aspect of the invention, a video imaging apparatus comprises a first cathode-ray tube having a first ultor electrode and a first focus electrode, and a second cathode-ray tube having a second ultor electrode and a second focus electrode. A power supply generates an ultor voltage coupled to the first and second ultor electrodes having a fluctuating voltage component produced by beam current variations. A high voltage amplifier generates a dynamic focus voltage component at a frequency related to a deflection frequency. A combining network combines the fluctuating voltage component and the dynamic focus voltage component to develop a combined, dynamic focus voltage. A first voltage divider is responsive to the combined, dynamic focus voltage for developing from the combined, dynamic focus voltage a first dynamic focus voltage at the first focus electrode, and a second voltage divider is responsive to the combined, dynamic focus voltage for developing from the combined, dynamic focus voltage a second focus voltage at the second focus electrode.

BRIEF DESCRIPTION OF THE DRAWING

FIGS. 3a and 3b are frequency plots of the phase and amplitude components, respectively, of the transfer of dynamic focus signals through the combiner of FIG. 1a.

DESCRIPTION OF THE INVENTION

Figure 1A:
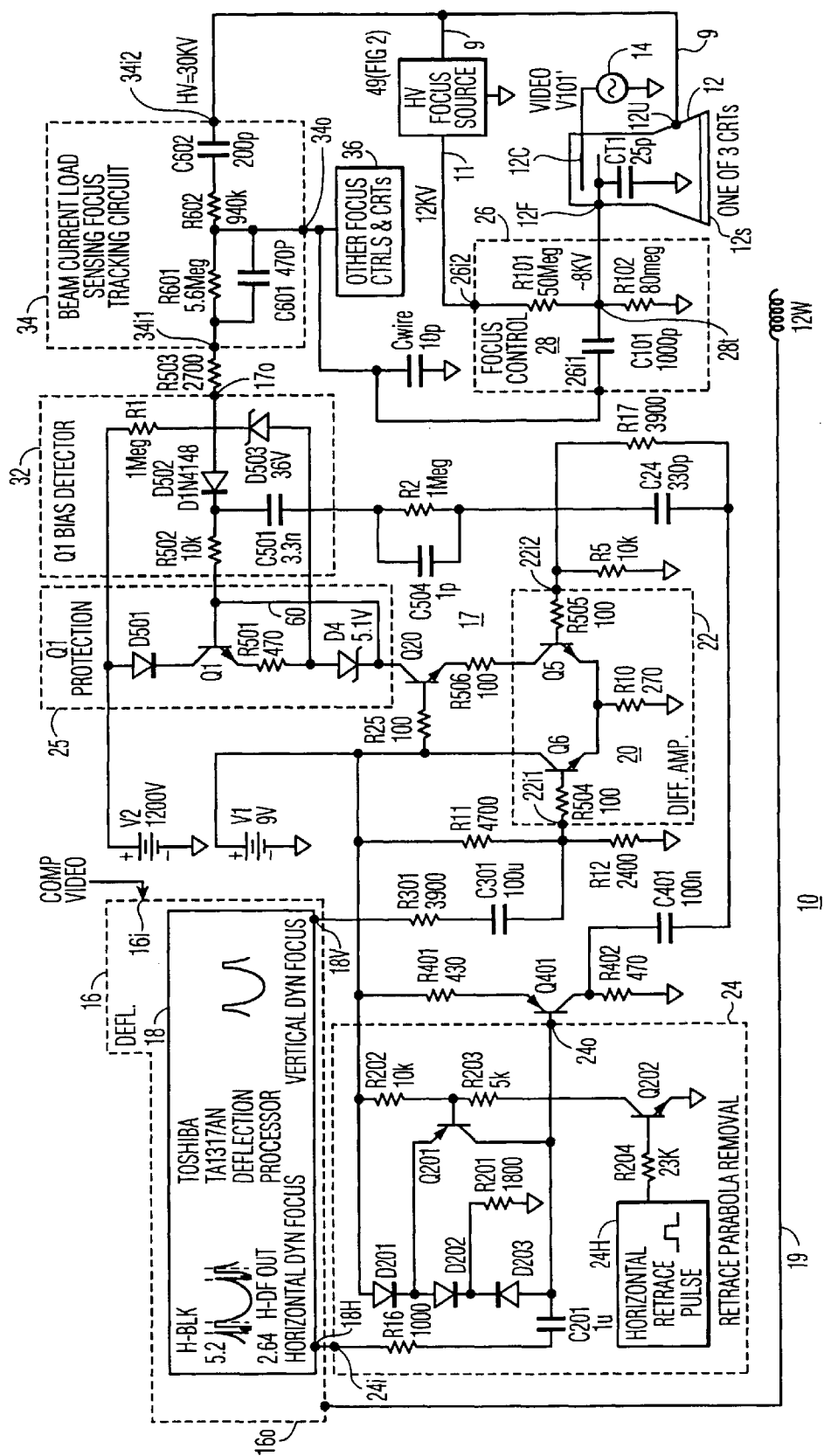
FIGS. 1a and 1b are a simplified diagram in block and schematic form illustrating inter alia a dynamic focus and high voltage-related focus signal combiner according to an aspect of the invention.

In FIG. 1*a*, a television apparatus designated generally as 10 includes at lower right a cathode-ray tube (CRT) or kinescope 12 which includes a screen 12*s*, an ultor or high voltage (anode) terminal 12U, a focus terminal 12F, and a cathode 12C. Cathode 12C of CRT 12 is illustrated as being connected to a source of image signal in the form of video source 14. As noted in FIG. 1*a*, CRT 12 may be one of three similar CRTs, as might be used, for example, in a projection television arrangement.

Figure 1B:
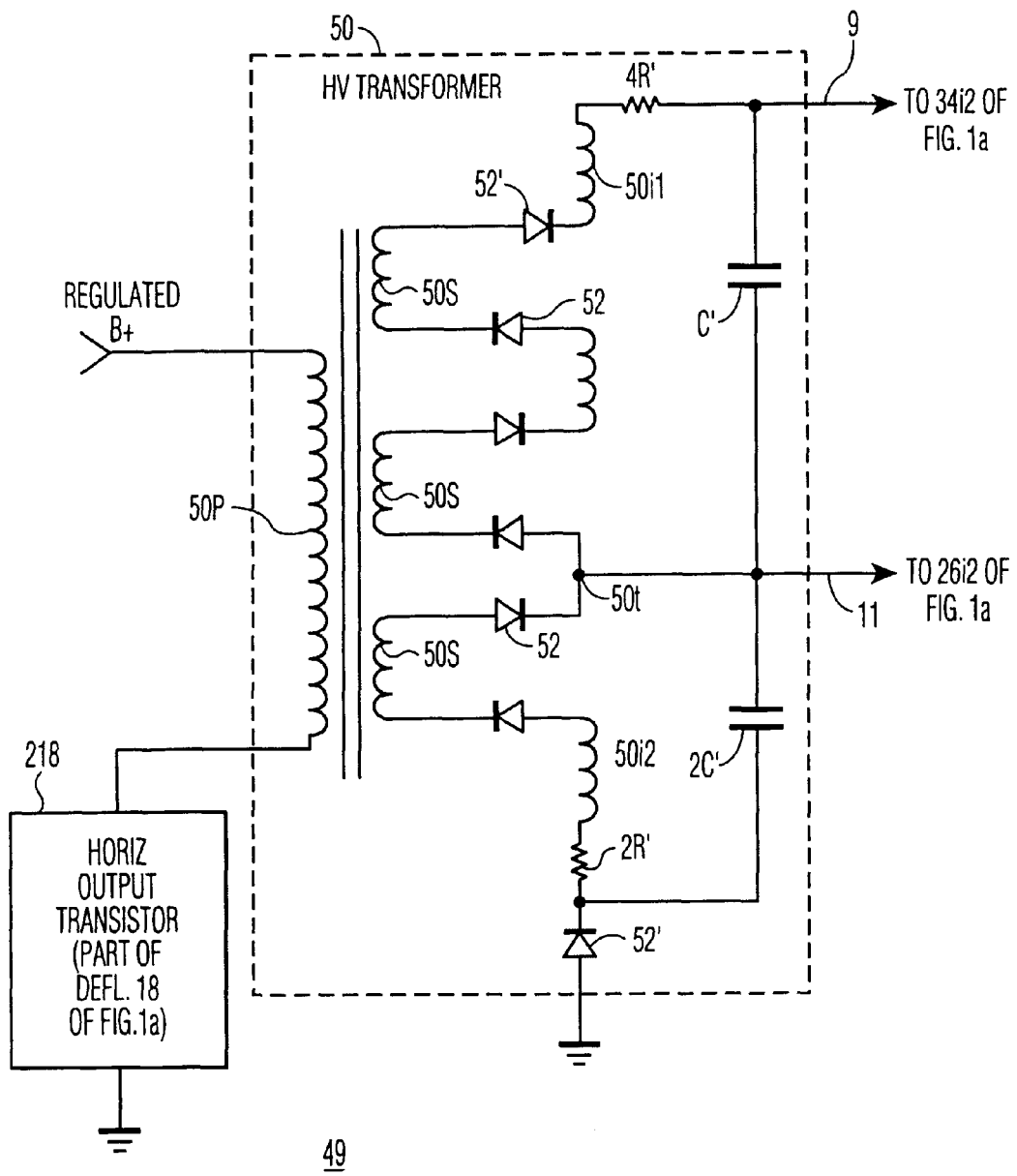

The ultor or high voltage terminal 12*u* of CRT 12 of FIG. 1*a* is connected by way of a conductor 9 to an ultor or high voltage and focus voltage source illustrated as a block 49. Block 49 is illustrated in more detail in FIG. 1*b*. In FIG. 1*b*, elements corresponding to those of FIG. 1*a* are designated by like reference numerals. Structure 49 of FIG. 1*b* includes an integrated high voltage/focus voltage transformer/rectifier arrangement designated generally as 50, which includes a primary winding 50*p* having one end connected to a source of regulated B+ and another end connected to a horizontal output transistor illustrated as a block 218, which is a part of deflection block 18 at upper left of FIG. 1*a*. Transformer 50 of FIG. 1*b* also includes a distributed secondary winding made up of secondary sections designated 50*s*, with a rectifier or diode, some of which are designated 52, located between each pair of secondary sections. The uppermost secondary winding 50*s* in transformer 50 is connected by way of the serial combination of an inductor 50*i* and a further rectifier or diode 52' to high voltage conductor 9, from which the high voltage is coupled to ultor terminal 12*u* of FIG. 1*a*. The lowermost secondary winding 50*s* of transformer 50 of FIG. 1*b* is connected by way of the series combination of an inductor 50*i*2 and a diode 52" to ground. Resistor 4R' represents the distributed resistance of the secondary windings 52 lying above tap 50*t*, and a capacitor C' connected between transformer terminal 9 and tap 50*t* represents the distributed capacitance of the windings lying above tap 50*t*. Similarly, resistor 2R' represents the distributed resistance of windings 52 and inductor 50*i* 2, lying below tap 50*t* of transformer 50, and capacitor 2C' represents the distributed capacitance. Tap 50*t* of transformer 50 of FIG. 1*b* is connected by way of a focus voltage conductor 11 to input terminal 26*i*2 of focus control 26 of FIG. 1*a*. Within focus control 26 of FIG. 1*a*, the focus voltage from transformer 50 is coupled to focus terminal 12F by means of a focus control 26 voltage divider designated as 28. Voltage divider 28 includes resistors R101 and R102, with a tap 28*t* therebetween. Tap 28*t* is connected to focus terminal 12F of CRT 12. Focus control 26 includes an input port 26*i*1 to which other focus signals may be applied.

Also in FIG. 1*a*, a deflection arrangement (Defl) illustrated at upper left as a block 16 receives composite video or at least separated synchronization signals at a port 16*i*. Deflection arrangement 16 produces vertical and horizontal deflection signals, illustrated together as being generated at an output terminal 16*o* and applied by way of a path 19 to deflection windings, illustrated together as 12W, which is or are associated with the CRT 12, all as known in the art. Deflection arrangement 16 also includes a deflection processor 18, which for example is a Toshiba TA1317AN deflection processor. Deflection processor 18 produces horizontal dynamic focus signals at an output port 18H, and vertical dynamic focus signals at an output port 18V.

A dynamic focus combining circuit and amplifier, designated generally as 20 in FIG. 1*a*, includes a differential amplifier 22 including NPN transistors Q5 and Q6, together with a common emitter resistor R10 and base resistors R504 and R505. Vertical dynamic focus signals from terminal 18V of deflection processor 18 are applied by way of an AC-gain determining resistor R301 and a dc blocking capacitor C301 to a first input port 22*i*1 of differential amplifier 22. A voltage divider including resistors R11 and R12 provides bias and additional AC gain control for input terminal 22*i*1 of differential amplifier 22. Horizontal dynamic focus signals produced at terminal 18H of deflection processor 18, contain, or are associated with, a retrace parabola. The retrace parabola is removed from the horizontal dynamic focus signals in order to limit the bandwidth of the signals so that following slew-rate-limited circuits can respond usefully. The horizontal rate dynamic focus signals are applied from output terminal 18H of deflection processor 18 to an input port 24*i* of a retrace parabola removal circuit 24. The retrace parabola is removed from the horizontal dynamic focus signal by retrace parabola removal circuit 24, which includes transistors Q201 and Q202, diodes D201, D201, and D203, capacitor C201, and resistors R16, R201, R202, R203, and R204.

In FIG. 1*a*, retrace parabola removal circuit 24 includes the series combination of a resistor R16 and a coupling capacitor C201 electrically connected between input port 24*i* and output port 24*o*, so that in the absence of the remainder of the parabola removal circuit 24, the horizontal-rate dynamic focus signals are coupled from input port 24*i* to output port 24*o* without change. A source 24H of horizontal retrace pulses couples positive-going pulses by way of a resistor R204 to the base of a grounded-emitter NPN transistor Q202. Transistor Q202 is nonconductive during the horizontal trace interval, and conductive during the horizontal retrace interval. When transistor Q202 is nonconductive during the horizontal trace interval, PNP transistor Q201 receives no base bias, and is nonconductive. During horizontal retrace, when transistor Q202 is conductive, a voltage divider including resistors R202 and R203 applies a forward bias to the base-emitter junction of transistor Q201, as a result of which transistor Q201 turns ON. The emitter current of transistor Q201 flows through a diode D201 to the +V1 supply voltage, so the emitter of transistor Q201 is held at a voltage which is one semiconductor junction voltage drop (one VBE) below or more negative than the +V1 source voltage. Transistor Q201 also saturates or achieves a state of little collector-to-emitter voltage drop, so the collector of Q201, and therefore output port 24*o*, rises to within one VBE of the +V1 source. Thus, the output voltage of retrace parabola removal circuit 24 is set to a fixed voltage during horizontal retrace, regardless of the magnitude of the horizontal dynamic focus signal applied to input port 24*i*. A diode D202 and a resistor R201 together form a voltage divider that provides a reference voltage two (2) diode voltage drops (2VBE) below or more negative than the +V1 voltage source applied to the anode of D201. Thus, the cathodes of diodes D202 and D203 are 2VBE below +V1. Diode D203 together with capacitor C201 clamps the most positive portion of the horizontal dynamic focus waveform to the voltage at the emitter of transistor Q201. The voltage drops across diodes D202 and D203 cancel each other, and minimize changes in the clamped output signal due to temperature-dependent changes in the diode VBE. Similarly, diode 201 cancels the VBE drop in transistor Q401 such that the collector current from Q401 is zero during the most positive portion of the waveform at the base of transistor Q401. This clamps to ground the most negative portion of the waveform appearing in inverted form across resistor R402, including that portion or part eliminated during horizontal retrace by switching transistor Q201. The ground clamping action maintains a predictable direct voltage or DC if the horizontal dynamic focus waveform amplitude changes, as for example by bus control of Deflection Processor IC 18.

The horizontal dynamic focus signals with retrace parabola removed are generated at an output port 24o of retrace parabola removal circuit 24 of FIG. 1a, and are applied to the base of an inverting amplifier including PNP transistor Q401 and resistors R401 and R402. The amplified horizontal dynamic focus signals (with retrace parabola removed) are capacitively coupled from the collector of transistor Q401 by way of the series-parallel combination of an AC gain determining resistor R17 and capacitors C24 and C401 to the second input port 22i2 of differential amplifier 22. Differential amplifier 22 produces collector currents from both transistors which are related to the combination of the vertical and horizontal dynamic focus signals. The currents in the collector of transistor Q6 flow to direct voltage supply V1 without any effect. The current flow in the collector of Q5 represents the desired combined dynamic focus signals.

The "dynamic focus amplifier" designated generally as 17 in FIG. 1a includes differential amplifier 22, a Q1 Protection Circuit designated as a block 25, a Q1 Bias Detector circuit 32, feedback components R2 and C504, direct-current (DC) gain determining resistors R5, R11, and R12, vertical gain determining components R301, C301, R11, and R12, horizontal gain determining components C401, C24, and R17, and surge limiting resistors R503 and R25, all of which are discussed below. Terminal 17o is the output port of the dynamic focus amplifier 17.

A transistor Q20 of FIG. 1a is connected in a cascode arrangement with transistor Q5 of differential amplifier 22, with a low-value surge-protection resistor R506 therebetween. Transistor Q20 is a high-voltage transistor with low current gain and high voltage gain. The base of transistor Q20 is connected by a surge protection resistor R25 to direct voltage source V1, so the emitter of transistor Q20 can never rise above voltage V1. This arrangement also maintains constant voltage at the collector of transistor Q5, so there is no voltage change at the collector which can be coupled through the collector-to-base "Miller" capacitance to act as degenerative feedback at higher frequencies, so that transistor Q5 maintains a broad bandwidth.

Transistors Q1 and Q20 of FIG. 1a, and their ancillary components, together constitute a portion of high-voltage dynamic focus signal amplifier 17 for amplification of the combined dynamic focus signals. The load on the dynamic focus signal amplifier 17 is largely capacitive and equal to the parallel combination of capacitors C602, Cwire, and CT1 in the CRT(s) which is(are) driven with amplified dynamic focus signal. This parallel capacitance is charged through transistor Q1 and discharged through transistor Q20. In FIG. 1a, the collector of NPN transistor Q1 is connected by way of a diode D501 to receive supply voltage V2, and its emitter is connected by way of a resistor R501 and a zener diode D4 to the collector of transistor Q20. The base of transistor Q1 is connected by a conductor 60 to the collector of transistor Q20. The base of transistor Q1 is also connected by way of a resistor R502 to the junction of a capacitor C501 and the cathode of a diode D502. The other end of capacitor C501, and the cathode of a zener diode D503, are connected to the junction of resistor R501 with the anode of zener diode D4. The cathode of diode D502 and the anode of zener diode D503 are connected to output terminal 17o of Q1 bias detector 32. Resistor R2 in parallel with capacitor C504 provide degenerative feedback from a location near the output terminal 17o to input port 22i2 of differential amplifier 22.

In operation of dynamic focus signal amplifier 17 of FIG. 1a, the collector current of transistor Q5 is coupled through The emitter-to-collector path of transistor Q20, diode D4, capacitor C501 and diode D502 to the output 17o of dynamic focus amplifier 17. As a result of the current flow from transistor Q20 to output terminal 17o, capacitor C501 charges. The charging continues until the zener or breakdown voltage of zener diode D503 is reached, after which time D503 conducts so as to hold the voltage across capacitor C501 constant and equal to the zener voltage. A small fraction of the collector current of Q20 flows through resistor R502. During conduction of collector current in transistor Q20, transistor Q1 is maintained OFF or nonconductive because the voltage drop across zener diode D4 reverse-biases the base-emitter junction of transistor Q1.

When collector current in transistor Q20 of FIG. 1a decreases to zero during a portion of the operating cycle of dynamic focus signal amplifier 17, transistor Q1 is turned ON or rendered conductive by discharge of capacitor C501 through resistor R502, the base-emitter junction of transistor Q1, and resistor R501 back to capacitor C501. With Q1 conductive, a substantial Q1 current tends to flow from supply V2 through diode D501, the collector-to-emitter path of transistor Q1, resistor R501, and forward-biased diode D503 to the amplifier output terminal 17o. Overcurrent damage to transistor Q1 is prevented by a feedback voltage developed across emitter resistor R501, which limits the collector current to a value established by the zener voltage of diode D4 (minus one base-emitter junction voltage) felt across the emitter resistor R501, so that Q1 operates at constant current when the zener voltage is reached. Capacitor C501 stores sufficient charge to keep Q1 ON during that entire portion of the amplifier cycle during which Q20 is OFF, and also to keep Q1 ON when the collector-to-emitter voltage of Q1 is low. This allows the maximum positive amplifier voltage to closely approach the voltage of supply V2. Resistor R1, connected between the positive V2 supply and output terminal 17o, precharges capacitor C501 at start-up so that the cyclic AC pumping operation can start. Diode D501 in conjunction with resistor R502 tend to protect transistor Q1 from overcurrent through its collector-to-base junction in the event of an internal arc in picture tube 12 between the high voltage or ultor terminal 12U and the focus terminal 12F.

Amplifier 17 of FIG. 1a may be considered to be a high voltage operational amplifier, at least from the point of view of its output terminal 17o. In this operational amplifier, resistor R2 and capacitor C504 provide feedback from output to input, and resistors R5, R11, and R12 set the direct (DC) operating point. Resistor R17 and capacitor C24 set the dynamic or AC gain for horizontal-rate dynamic focus signals, while resistors R301, R11, and R12 together with capacitor C301 set the dynamic or AC gain for vertical-rate dynamic focus signals.

The amplified combined vertical and horizontal dynamic bias signals produced at output port 17o of Q1 Bias Detector 32 of FIG. 1a may be viewed as being produced by a low-impedance source. The signals are applied from port 17o through a surge limiting resistor R503 to a first input port $34i_1$ of a beam current load sensing focus tracking circuit 34 ("combining" circuit 34). A second input port $34i_2$ is connected to the ultor terminal 12U of picture tube 12, for receiving the ultor voltage. An output port 34o of beam current load sensing focus tracking or combining circuit 34 is connected to input port 26i1 of focus control block 26, and possibly to other corresponding focus controls associated with other picture tubes than picture tube 12, all illustrated together as a block 36. A cost saving according to one aspect of the invention is achieved over regulated high voltage sources by allowing the high voltage to vary in response to beam current. Thus, high voltage source 49 is not regulated.

As illustrated in FIG. 1a, a resistor R601 is connected in parallel with a capacitor C601, and the parallel combination of R601 with C601 is connected at one end to input port $34i_1$ of combining circuit 34. The other end of the parallel combination of R601 with C601 is connected to output port 34o of combining circuit 34. Combining circuit 34 also contains the series combination of a resistor R602 with a capacitor C602, and one end of the series combination is connected to second input port $34i_2$, while the other end of the series combination is connected to output port 34o.

Beam current load sensing focus tracking circuit 34 of FIG. 1a may be viewed as a frequency-sensitive combiner, which combines the combined vertical and horizontal dynamic focus signals applied to its first input terminal $34i_1$ with components of the high voltage applied to its second input port $34i_2$. The resulting combined signals are applied to input port $26i_1$ of focus control block 26 for combination with a "static" component of the focus voltage.

The focus control 26 and the beam current load sensing focus tracking circuit 34 of FIG. 1a can be made by using the following values of components

| R101 | 50 | Megohms |
| R102 | 80 | Megohms |
| R601 | 5.6 | Megohms |
| R602 | 940 | Kilohms |
| C101 | 1000 | picofarads |
| C601 | 470 | picofarads |
| C602 | 2100 | picofarads |

The stray wiring capacitance is designated as $C_{wire}$ and has a value of 10 picofarads, and the capacitance CT1 of the focus electrode of a single picture tube, such as picture tube 12, is about 25 picofarads. The output impedance of the Q1 Bias Detector 32 and the resistance of R503 are ignored as being too small relative to other values to affect the results. Those skilled in the art will recognize that the series capacitor C602 connected between second input port $34i_2$ and output terminal 34o of combining circuit 34 allows only variations or changes ("sag") in the high voltage to be coupled to output port 34o. Similarly, the presence of capacitor C101 connected between input port 26i1 of focus control block 26 and tap 28t of voltage divider 28 prevents the coupling of direct signal components to the tap 28t. Capacitor C101 together with the parallel combination of resistors R101 and R102 constitutes a high-pass filter having a cutoff or break frequency of about 5 Hertz (Hz).

Figure 2:
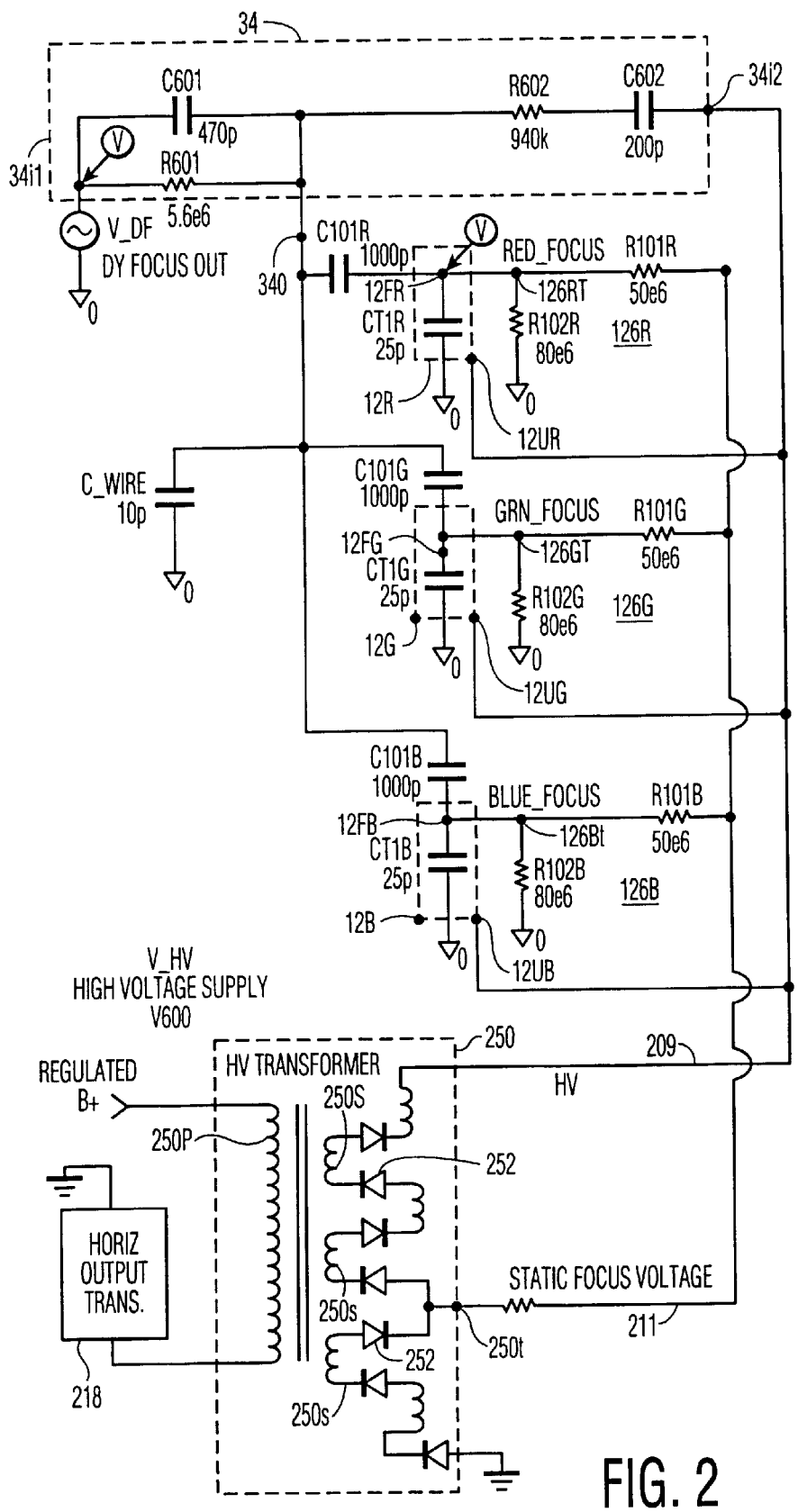
FIG. 2 is a simplified equivalent diagram of an arrangement according to an aspect of the invention in which three picture tubes are used.

FIG. 2 is a simplified equivalent circuit or schematic diagram of a television or video display apparatus according to an aspect of the invention in which red, green, and blue cathode-ray or picture tubes are used for the display. The red, green and blue picture tubes are illustrated as blocks 12R, 12G, and 12B, respectively, their ultor terminals are identified as 12UR, 12UG, and 12UB, respectively, and their focus terminals are identified as 12FR, 12FG, and 12FB, respectively. In FIG. 2, elements corresponding to those of FIG. 1a are designated by like reference numerals. Elements R101, R102, and C101 have appended letters R, G or B to identify corresponding elements associated with the red, green and blue cathode-ray tube displays, respectively. In FIG. 2, a source V_DF represents the combined vertical and horizontal dynamic focus signal source applied to first input port $34i_1$ of combiner 34.

Source V_HV of FIG. 2 represents the high or ultor supply voltage source. Voltage source V_HV includes an integrated transformer 250 with a primary winding 250p. Primary winding 250p is connected at one end to a source of regulated B+ and at the other end to a block representing a switching horizontal output transistor. Transformer 250 also includes a distributed secondary winding, including a plurality of windings, each of which is designated 250s. The distributed secondary winding of transformer 250 is grounded at one end. A set of diodes, some of which are designated as 252, is interspersed between the winding secondary sections 250s, and act to rectify the high voltage produced on an output conductor illustrated as 209. A "static" focus voltage is produced at a tap 250t of transformer 250. In one embodiment of the invention, tap 250t is a ⅓ tap relative to the ultor voltage, so that the static focus voltage produced at tap 250t is about ⅓ of the high voltage produced on conductor 209, and remains at a fixed percentage of the ultor voltage.

The high or ultor voltage V_HV is coupled by way of conductor 209 to terminal 34i2 of combining circuit 34, and to the ultor connections 12UR, 12UG, and 12UB of the red, green, and blue picture tubes 12R, 12G, and 12B, respectively, of FIG. 2, so that combiner 34 and all the cathode-ray tubes are fed in common from the ultor supply V_HV. The static focus voltage is coupled from tap 250t by way of a conductor illustrated as 211 to the red, blue and green focus terminals 12FR, 12FG, and 12FB, respectively, by resistive voltage dividers 126R, 126G, and 126B, respectively. Voltage divider 126R includes series resistor R101R and shunt resistor R102R having a tap 126Rt therebetween. Tap 126Rt is coupled to red picture tube focus terminal 12FR. Resistor R101R has a value of 50 Megohms and resistor R102R has a value of 80 Megohms. Similarly, voltage divider 126G includes series resistor R101G and shunt resistor R102G having a tap 126Gt therebetween. Tap 126Gt is coupled to green picture tube focus terminal 12FG. Resistor R101G has a value of 50 Megohms, and resistor R102G has a value of 80 Megohms. Also, voltage divider 126B includes series resistor R101B and shunt resistor R102B having a tap 126Bt therebetween. Tap 126Bt is coupled to blue picture tube focus terminal 12FB. Resistor R101B has a value of 50 Megohms and resistor R102B has a value of 80 Megohms. Thus, each focus terminal 12FR, 12FG, and 12FB of the red, green, and blue picture tubes "sees" its static focus voltage as being sourced from an impedance of about 30 Megohms, just as in the arrangement of FIG. 1a.

Output terminal 34o of combiner 34 of FIG. 2 is coupled to each of the red, green and blue focus terminals 12FR, 12FG, and 12FB, respectively, by a coupling capacitor C101R, C101G, and C101B, respectively. Each of capacitors C10R, C10G, and C101B has a value of 1000 pF. The capacitance of the red, green and blue picture tubes are designated as CT1R, CT1G, and CT1B, respectively.

Figure 3A:
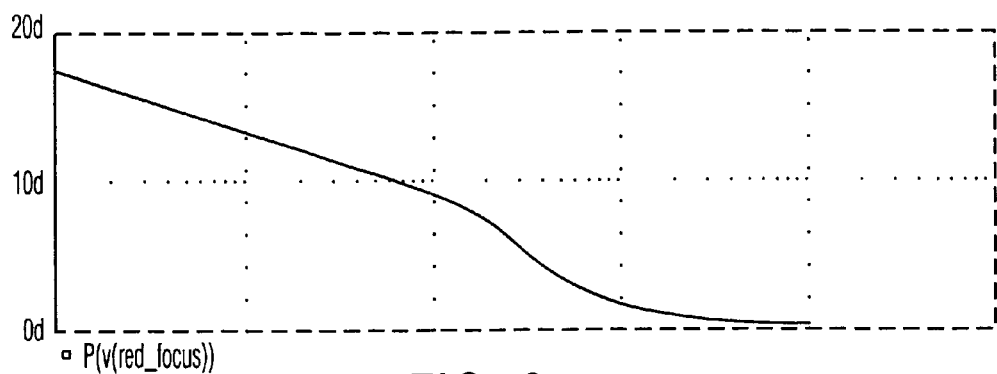
Figure 3B:
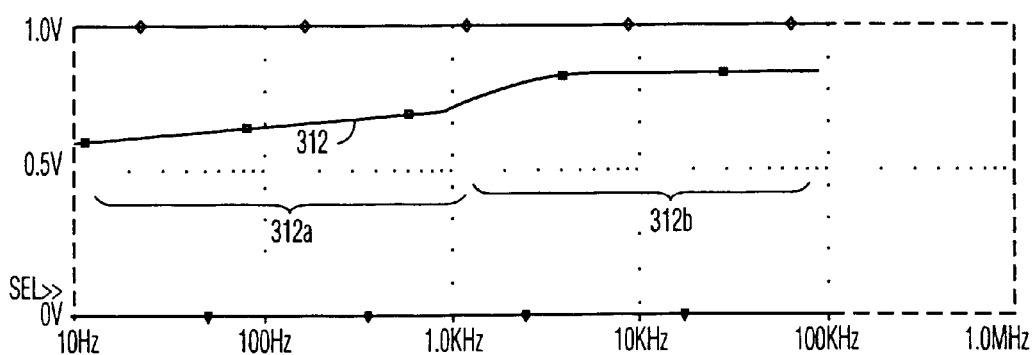

FIG. 3b illustrates a plot 312 of the amplitude of the transfer of the combined vertical and horizontal dynamic focus signal from input port $34i_1$ of combining circuit 34 to output port 34o, and FIG. 3a illustrates a plot 310 of the relative phase, all over a frequency range extending from 10

Hz to 100 kiloHertz (kHz). As illustrated by plot 312 in FIG. 3b, the amplitude transfer of the dynamic focus signals includes two major portions, designated as 312a and 312b. Portion 312a extends up to about 1 kilohertz (kHz), and portion 312b extends above about 3 kHz. Within portion 312a, about two-thirds (⅔) of the dynamic focus signals are coupled through the combining circuit 34, and the dynamic focus signals are only slightly attenuated at frequencies above about 3 kHz.

The vertical-rate dynamic focus parabola signal has a base frequency of 60 Hz, with harmonics extending higher in frequency. Most of the energy of the vertical-rate dynamic focus signals lies below about 1 kHz. In the 60 Hz to 1 kHz frequency range, it is desirable to have nearly flat amplitude response and a log-plot-linear phase response in order to maintain the wave shape. The horizontal base frequency is about 32 kHz (for at least some television displays), with harmonics extending upward in frequency nearly to 1 MHz. In the frequency range extending from about 30 kHz to about 1 MHz, the amplitude response of the dynamic focus signals is desirably to have nearly flat amplitude response, with log-plot-linear phase response, also to maintain wave shape. Phase errors in either the vertical or horizontal dynamic focus signals either distort the waveshape, or move the waveform away from the optimum timing position.

Figure 4A:
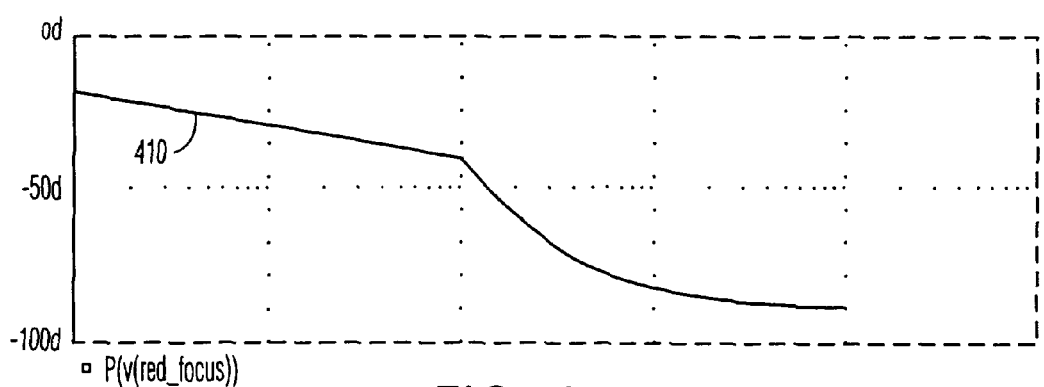
FIGS. 4*a* and 4*b* are frequency plots of the phase and amplitude components, respectively, of the transfer of high voltage signals through the combiner of FIG. 1*a*.
Figure 4B:
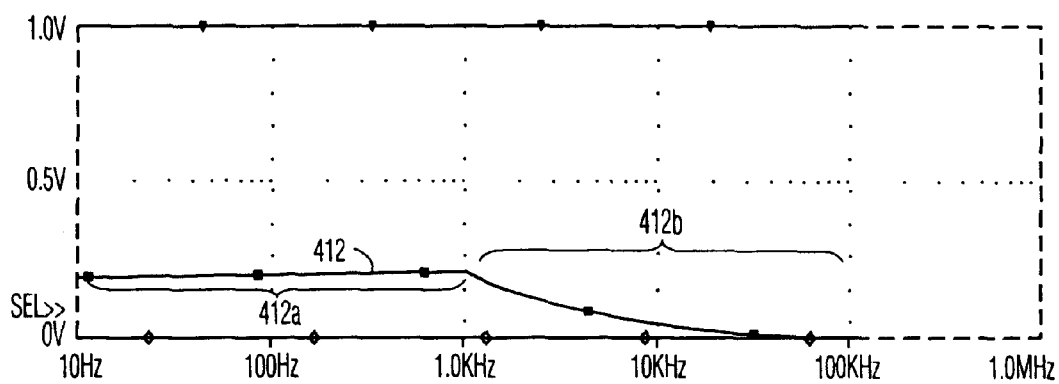

FIG. 4b illustrates a plot 412 of the amplitude of the transfer of the high or ultor voltage from second input terminal $34i_2$ to output terminal 34o. As illustrated, plot 412 represents by a portion 412a a transfer of about one fifth (⅕) of the high voltage variation or sag through the combining circuit for frequencies below about 1 kHz. Similarly, plot portion 412b of plot 412 show little or no transfer or frequencies above about 3 kHz. FIG. 4b illustrates by a plot 410 the phase variation of the transferred signal. It would be more desirable to transfer about one third (⅓ of the high voltage variation or sag rather than ⅕ as illustrated. However, the transfer of ⅕ still gives a pleasing picture. The percentage of high voltage sag which is coupled could be increased by making capacitor C602 smaller, thereby allowing or causing more dynamic focus signal insertion loss below 1 kHz. Such an increased loss could be offset by increasing the gain of the vertical parabola at some point along its path, so long as the peak-to-peak sum of the vertical and horizontal dynamic focus signals is maintained below the V2 supply voltage.

Taken together, combining circuit 34 combines about ⅔ of the dynamic focus signal (plot 312a) with about ⅕ of the high voltage sag (plot 412a) at frequencies below about 1 kHz for application to the focus terminal or grid of each of the three picture tubes. The dynamic focus signal components lying below 1 kHz are deemed to be mostly vertical dynamic focus signal components. The high voltage sag signals lying below 1 kHz principally represent changes due to high contrast horizontal video elements.

Among the features of the described arrangement are relatively low headroom requirements on the dynamic focus amplifier due to the addition of the video-dependent (high-voltage sag) components after or following the dynamic focus amplification, and maintenance of a relatively low impedance dynamic focus drive source so that wiring lead dress is not critical. Good transient response is provided for both dynamic focus signals and video related high voltage sag signals, and phase errors are small enough to prevent noticeable defocused areas in the picture.

Taken together, combining circuit 34 passes the dynamic focus signals above 30 kHz to the focus terminals without significant attenuation, and essentially none of the high voltage sag. Taking into account that the dynamic focus signals having frequency components at or above 30 kHz are mainly horizontal rate dynamic focus signals, it will be clear that the horizontal dynamic focus signals are coupled without significant attenuation to the focus terminal(s). Such a low-loss coupling of the horizontal-rate dynamic focus signals is advantageous principally in that it allows the dynamic focus amplifier to operate with minimum headroom. The magnitudes of the vertical and horizontal dynamic focus signals at the picture tube terminals are set by the picture tube manufacturer's specifications. If a loss were to be inserted into the path between the dynamic focus amplifier and the focus terminal(s) of the picture tube(s), as might be occasioned by a filter, then the loss would have to be compensated for by an appropriate increase in dynamic focus amplifier gain and dynamic output range. The increased-magnitude output signal of such an amplifier places more stress on the amplifier components and produces more heat, and the increase in dynamic output voltage may require an increase in the magnitude of the amplifier supply voltage V2 to avoid signal clipping.

In addition, the arrangement of FIGS. 1 and 2 with three picture tubes or kinescopes uses but a single high voltage capacitor C602 and a single high voltage resistor R602 to couple the ultor source V_HV to the combiner 34, rather than the three that might otherwise be used. This reduction in the number of expensive high voltage components is accompanied by a reduction in the volume of the potting container and potting compound which are required for use therewith.

What is claimed is:

1. A video imaging apparatus, comprising:
    a first cathode-ray tube having a first ultor electrode and a first focus electrode, and a second cathode-ray tube having a second ultor electrode and a second focus electrode;
    a power supply for generating an ultor voltage coupled to said first and second ultor electrodes having a fluctuating voltage component produced by beam current variations;
    a high voltage amplifier for generating a dynamic focus voltage component at a frequency related to a deflection frequency; and
    a combining network for combining said fluctuating voltage component and said dynamic focus voltage component to develop a combined, dynamic focus voltage, said combined, dynamic focus voltage being coupled to each of said first and second focus electrodes for developing from said combined, dynamic focus voltage each of a first dynamic focus voltage at said first focus electrode and a second dynamic focus voltage at said second focus electrode.

2. The video imaging apparatus according to claim 1, further comprising a direct current blocking capacitor coupled to said ultor voltage power supply and to said network for preventing said ultor voltage from introducing a direct current voltage component in said combined, dynamic focus voltage.

3. The video imaging apparatus according to claim 1, wherein said ultor voltage power supply also generates a direct current high voltage that is coupled to said first and second focus electrodes in a manner that bypasses said combining network.

4. The video imaging apparatus according to claim 1, wherein said combining network comprises a passive element and excludes any active element.

5. The video imaging apparatus according to claim 1, further comprising an impedance for coupling said combined, dynamic focus voltage to said first focus electrode, wherein said combining network is coupled to said second focus electrode in a manner that excludes said impedance.

6. The video imaging apparatus according to claim 1, wherein said impedance comprises a capacitor that is included in a capacitive voltage divider.

7. The video imaging apparatus according to claim 1, further comprising a first voltage divider for coupling said combined, dynamic focus voltage to said first focus electrode and a second voltage divider for coupling said combined, dynamic focus voltage to said second focus electrode.

8. The video imaging apparatus according to claim 1, wherein said combining network establishes in common a frequency characteristic of said first and second dynamic focus voltages.

9. A video imaging apparatus, comprising:
   a first cathode-ray tube having a first ultor electrode and a first focus electrode, and a second cathode-ray tube having a second ultor electrode and a second focus electrode;
   a power supply for generating an ultor voltage coupled to said first and second ultor electrodes having a fluctuating voltage component produced by beam current variations;
   a high voltage amplifier for generating a dynamic focus voltage component at a frequency related to a deflection frequency;
   a combining network for combining said fluctuating voltage component and said dynamic focus voltage component to develop a combined, dynamic focus voltage;
   a first voltage divider responsive to said combined, dynamic focus voltage for developing from said combined, dynamic focus voltage a first dynamic focus voltage at said first focus electrode; and
   a second voltage divider responsive to said combined, dynamic focus voltage for developing from said combined, dynamic focus voltage a second focus voltage at said second focus electrode.

10. The video imaging apparatus according to claim 9, wherein said ultor voltage power supply also generates a direct current high voltage that is coupled to said first and second focus electrodes in a manner that bypasses said combining network.

11. A video display apparatus, comprising:
   first and second kinescopes, each including ultor, electron beam modulation, and focus terminals, for generating electron beams impinging on display screens;
   a deflection arrangement for deflecting said electron beams across at least a portion of said display screens of said first and second kinescopes;
   a source of image signals coupled to said electron beam modulation terminals of said first and second kinescopes, for modulating said electron beam with image information synchronized to said deflection, for defining at least components of an image on said display screens;
   a single source of ultor voltage coupled to said ultor terminals of said first and second kinescopes, said source of ultor voltage being subject to variation in said ultor voltage in response to said modulation of said electron beams;
   a single source of direct first focus voltage directly coupled to said focus terminals of said first and second kinescopes, said first focus voltage being generally in a fixed proportion to said ultor voltage;
   a single source of second focus voltage responsive to said deflection of said electron beams; and
   coupling means coupled to said source of ultor voltage and to said source of second focus voltage, for coupling said sources of ultor and second focus voltage together and to said focus terminals of said first and second kinescopes in an amount related to the frequency components within said ultor and second focus voltages.

12. The apparatus according to claim 11, wherein said amount of said coupling is about ⅔ of said second focus voltage and about ⅕ of said ultor voltage in a frequency range lying below 1 kHz.

13. The apparatus according to claim 11, wherein said amount of said coupling is greater than about 80% of said second focus voltage in those frequencies lying above about 30 kHz.

14. The apparatus according to claim 13, wherein said amount of said coupling of said ultor voltage in those frequencies lying above about 30 kHz is less than 10%.

15. A television apparatus, comprising:
   first, second and third picture tubes, each including an ultor terminal and a focus terminal;
   a source of ultor voltage coupled to said ultor terminals of said first, second, and third picture tubes, said ultor voltage tending to change in response to flow of beam current in said picture tubes;
   a source of first focus voltage which tends to maintain a value which is a constant proportion of said ultor voltage, said source of first focus voltage being coupled to said focus terminals of said first, second, and third picture tubes;
   deflection means for deflecting said beams vertically and horizontally;
   a source of dynamic focus voltage which produces vertical- and horizontal-rate dynamic focus signals in response to said deflection;
   a coupling circuit including a first input terminal coupled to said source of ultor voltage, a second input terminal coupled to said source of dynamic focus voltage, and also including an output port coupled to said focus terminals of said first, second, and third picture tubes, for summing together and applying to said focus terminals of said first, second, and third picture tubes (a) a first proportion of said dynamic focus voltage having frequency components lying below a first frequency, (b) a second proportion of changes in said ultor voltage, and (c) a third proportion of said dynamic focus voltage having frequency components lying above a second frequency, greater than said first frequency.

16. The television apparatus according to claim 5, wherein said coupling circuit comprises:
   a series resistance-capacitance circuit having first and second terminals, said first terminal of said series resistance-capacitance circuit being coupled to said first input terminal of said coupling circuit;
   a parallel resistance-capacitance circuit including first and second terminals, said first terminal of said parallel resistance-capacitance circuit being connected to said second input terminal of said coupling circuit, and said second terminal of said parallel resistance-capacitance circuit being coupled to said second terminal of said series resistance-capacitance circuit and to said output port of said coupling circuit.

* * * * *